July 3, 1962     L. G. SIMJIAN     3,042,919
DEPOSITORY MACHINE COMBINED WITH CAMERA MEANS
Filed Jan. 25, 1960     9 Sheets-Sheet 1

*INVENTOR.*
LUTHER G. SIMJIAN
BY

AGENT.

July 3, 1962 L. G. SIMJIAN 3,042,919
DEPOSITORY MACHINE COMBINED WITH CAMERA MEANS
Filed Jan. 25, 1960 9 Sheets-Sheet 3

INVENTOR.
LUTHER G. SIMJIAN
BY
AGENT.

July 3, 1962 L. G. SIMJIAN 3,042,919
DEPOSITORY MACHINE COMBINED WITH CAMERA MEANS
Filed Jan. 25, 1960 9 Sheets-Sheet 4
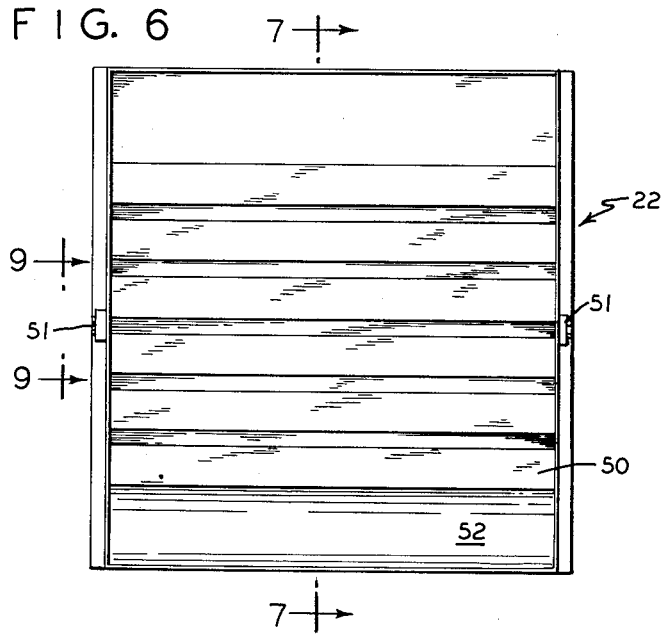
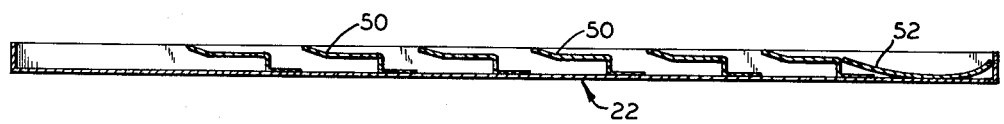
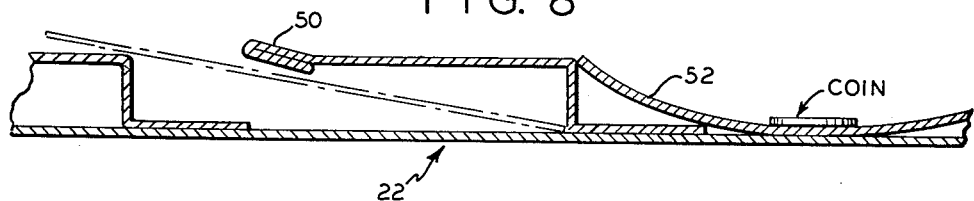
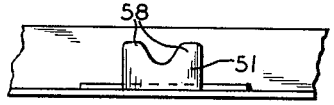
INVENTOR.
LUTHER G. SIMJIAN
BY
AGENT.

July 3, 1962   L. G. SIMJIAN   3,042,919
DEPOSITORY MACHINE COMBINED WITH CAMERA MEANS
Filed Jan. 25, 1960   9 Sheets-Sheet 5

INVENTOR.
LUTHER G. SIMJIAN
BY
Erwin B. Steinberg
AGENT.

July 3, 1962   L. G. SIMJIAN   3,042,919
DEPOSITORY MACHINE COMBINED WITH CAMERA MEANS
Filed Jan. 25, 1960   9 Sheets-Sheet 6

INVENTOR.
LUTHER G. SIMJIAN
BY
Erwin B. Steinberg
AGENT.

July 3, 1962
L. G. SIMJIAN
3,042,919
DEPOSITORY MACHINE COMBINED WITH CAMERA MEANS
Filed Jan. 25, 1960
9 Sheets-Sheet 7
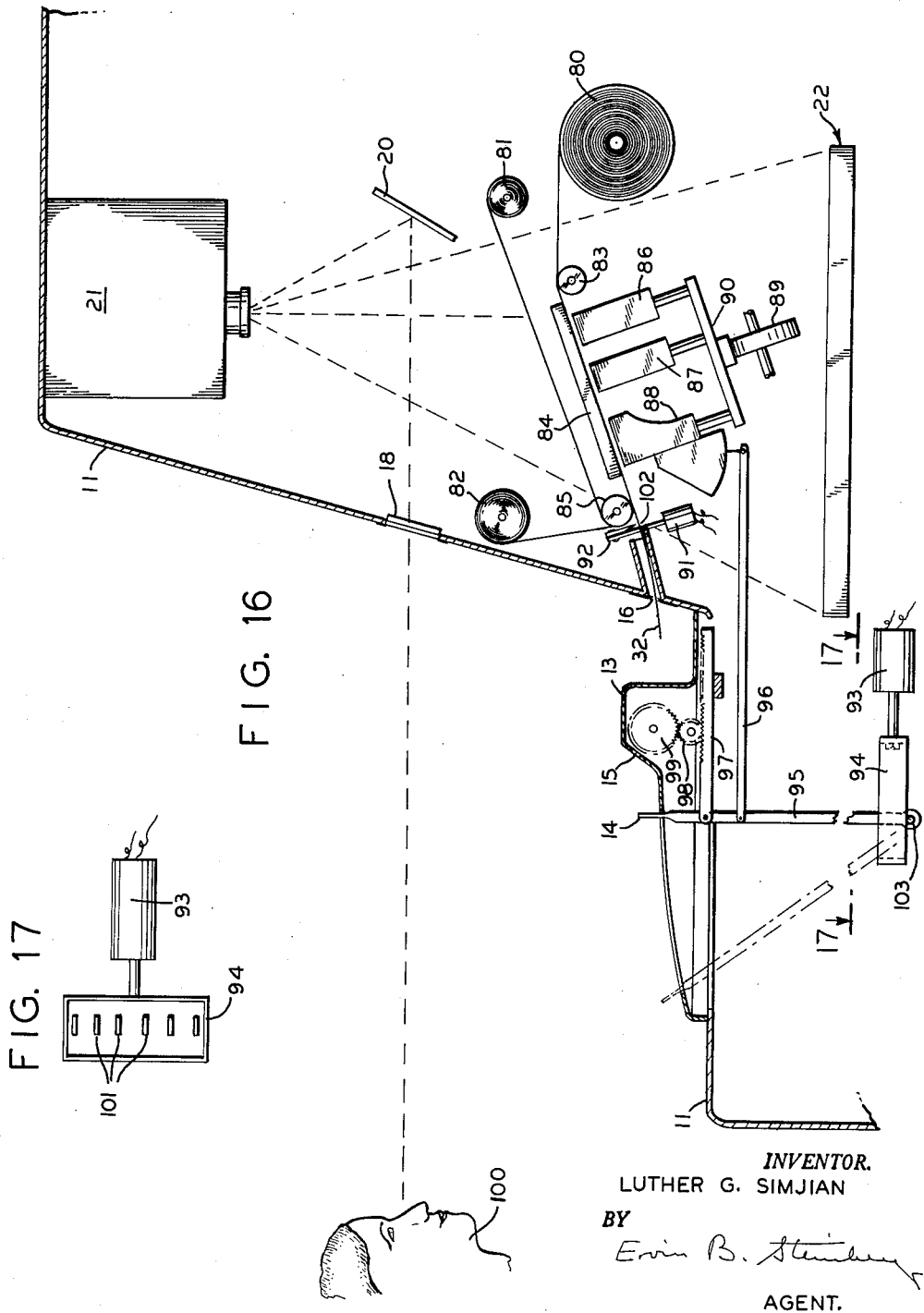
INVENTOR.
LUTHER G. SIMJIAN
BY
Erwin B. Steinberg
AGENT.

July 3, 1962 L. G. SIMJIAN 3,042,919
DEPOSITORY MACHINE COMBINED WITH CAMERA MEANS
Filed Jan. 25, 1960 9 Sheets-Sheet 8

INVENTOR.
LUTHER G. SIMJIAN
BY
AGENT.

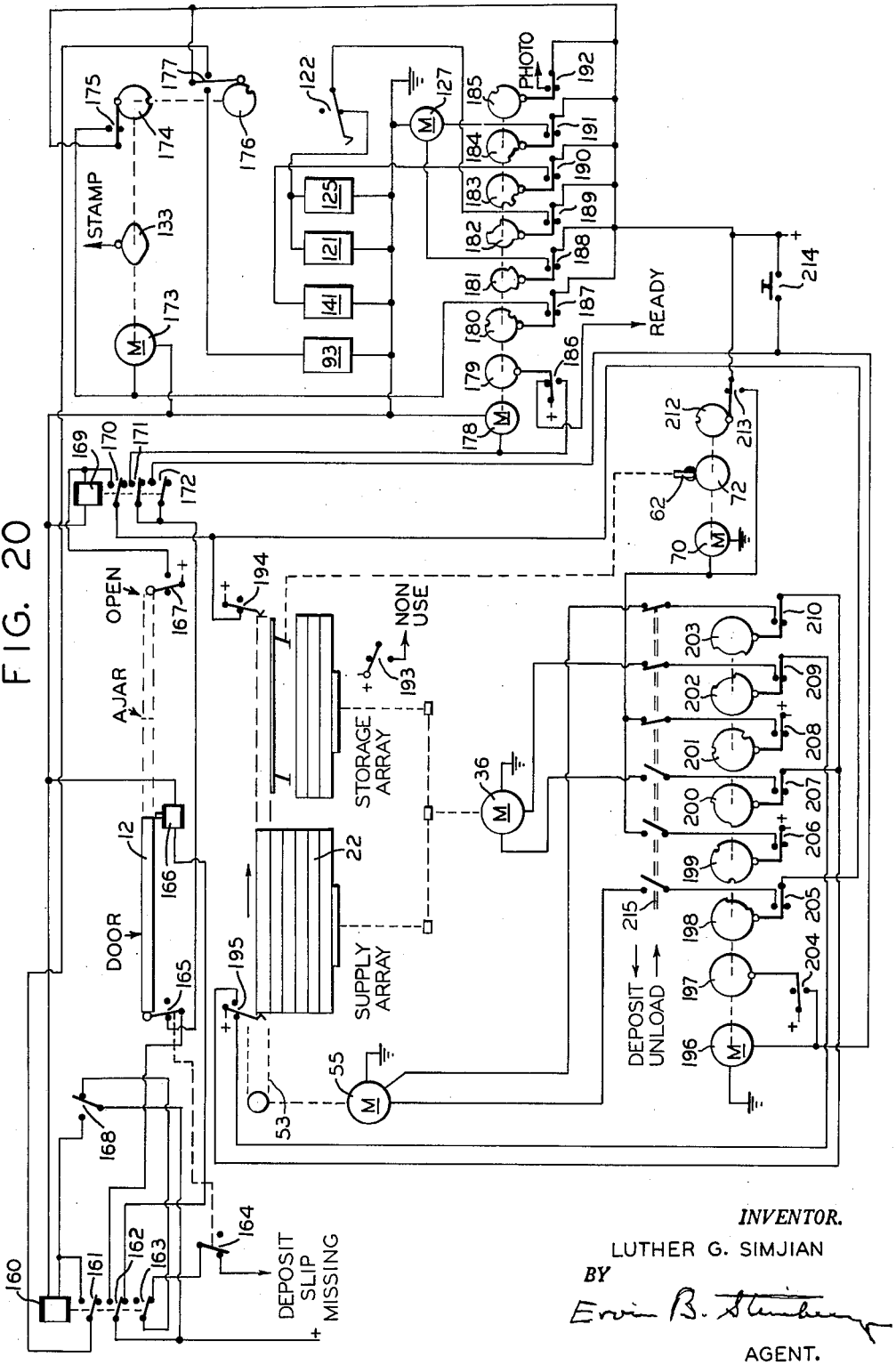

United States Patent Office 3,042,919
Patented July 3, 1962

3,042,919
DEPOSITORY MACHINE COMBINED WITH CAMERA MEANS
Luther G. Simjian, Greenwich, Conn., assignor to Universal Match Corporation, Ferguson, Mo., a corporation of Delaware
Filed Jan. 25, 1960, Ser. No. 4,371
12 Claims. (Cl. 346—22)

This invention relates to automatic machines for depositing an article of value and has particular reference to a machine which is adapted to accept checks or money and to issue a receipt in return for the deposit. Specifically, the machine is adapted to accept documents, checks, paper money, coin money and a deposit slip, to record an image of the deposited articles, and to return to the depositor a receipt which shows data supplied both by the depositor and the machine. The receipt rendered to the depositor is identifiable with respect to the recorded image of the deposit and thus, with the deposit itself.

The increasing demand for banking services, together with the need for economic operation of banking facilities has established the need for a depository machine which to some extent duplicates the services performed by a bank teller, yet provides important safeguards so that in the event of discrepancy, complete and unequivocal proof is available to the depositor and to the recipient of the deposit as to the character and nature of the deposit and the identity of the depositor.

Some of the problems involved in accomplishing this task have been solved by means of the apparatus disclosed in U.S. Letters Patent No. 2,909,107, issued October 20, 1959, to Luther G. Simjian, entitled "Vending Machine Combined With Camera Means," in co-pending application for U.S. Letters Patent, Serial No. 745,020, filed June 27, 1958, entitled "Vending Machine Combined With Image Recording Means," now U.S. Patent No. 2,927,515, dated March 8, 1960, or in co-pending application for U.S. Letters Patent, Serial No. 693,986, filed November 1, 1957, entitled "Depository Machine Combined With Camera Means," now U.S. Patent No. 2,936,684, dated May 17, 1960. The instant invention refers to a further and novel embodiment of the principles first disclosed in the patents and copending applications enumerated.

The instant application more specifically refers to an apparatus which readily can be installed in the conventional counterwall of a banking institution and preferably, several such machines are serviced by a teller who is available also for rendering assistance to customers whenever need arises. The depository machine in accordance with the present invention exposes to the customer a compartmentized receptacle into which the depositor inserts the deposit, specifically money and checks as well as a conventional deposit slip form which has been filled out in the usual manner. Additionally, control means are available to the depositor enabling him to adjust a value which corresponds to the totalized sum of the deposit as indicated on the bottom line of the deposit slip. Upon starting the machine, the receptacle containing the deposit is rendered inaccessible to the depositor and a receipt is printed containing among other data, the deposit date, a transaction number and the totalized value as previously adjusted by the depositor. Furthermore, the deposit in the receptacle is photographed by image recording means of the apparatus in identifiable relation with the data provided on the receipt and, subsequently, the receipt is issued to the depositor while a copy thereof remains within the machine, or if desired, is filled with the deposit. When this cycle of events has taken place, the receptacle containing the deposited items has been moved to a storage position and a new and empty receptacle has become accessible for acceptance of a further deposit.

It will be noted that in the described arrangement, each receptacle contains only a single deposit which readily can be correlated with a transaction number. When all or almost all receptacles have been filled, the storage machanism which contains the individual receptacles can be taken out of the machine enclosure and the receptacles, one by one, are emptied and checked by a teller disposed behind the counter.

The image recording means are used to provide a record of the deposit as well as of the receipt issued to the depositor and thus, provide a pictorial record as may be required to resolve discrepancies. When no discrepancy is found, the developing of the recording medium may be deleted. As a further feature of the instant apparatus, a pictorial record of the depositor is provided in order to furnish additional safeguards as may be desirable.

One of the objects of this invention, therefore, is the provision of a depository machine combined with camera means adapted to accept a monetary deposit and provide proof as to the nature and character of the deposit.

Another object of this invention is the provision of a depository machine which automatically accomplishes certain functions conventionally performed by a bank teller.

Another object of this invention is the provision of a depository machine which may be installed conveniently in banking establishments and whereby several machines can readily be serviced by a teller.

A further object of this invention is the provision of a depository apparatus combined with image recording means including means for providing a receipt to the depositor effecting a deposit.

A further object of this invention is the provision of a depository apparatus which includes individual receptacles for maintaining a deposit separate from a succeeding deposit.

Another and further object of this invention is the provision of a depository machine which is simple in its construction and which is convenient for use by the public, as well as for the institution rendering this machine available to customers.

Another and still further object of the present invention is the provision of a depository machine which furnishes in an automatic manner certain banking services heretofore made possible only by personal confrontation with a teller.

Further and still other objects of the present invention will be apparent from the following description taken in conjunction with the accompanying drawings in which:

FIGURE 6 is a top plan view of a single receptacle adapted to receive articles for deposit;

FIGURE 7 is a sectional view along lines 7—7 in FIGURE 6;

FIGURE 8 is an enlarged view of certain portions in FIGURE 7;

FIGURE 9 is a side view of certain portions of the receptacle viewed along lines 9—9 in FIGURE 6;

FIGURE 16 is an elevational side view of an upper portion of the present machine with the outside enclosure removed in order to reveal the receipt printing and issuing mechanism;

FIGURE 17 is a sectional view taken along lines 17—17 in FIGURE 16;

FIGURE 20 is a schematic electrical circuit diagram for the machine depicting the electrical interconnections in order to render the instant machine operative.

Figure 1:
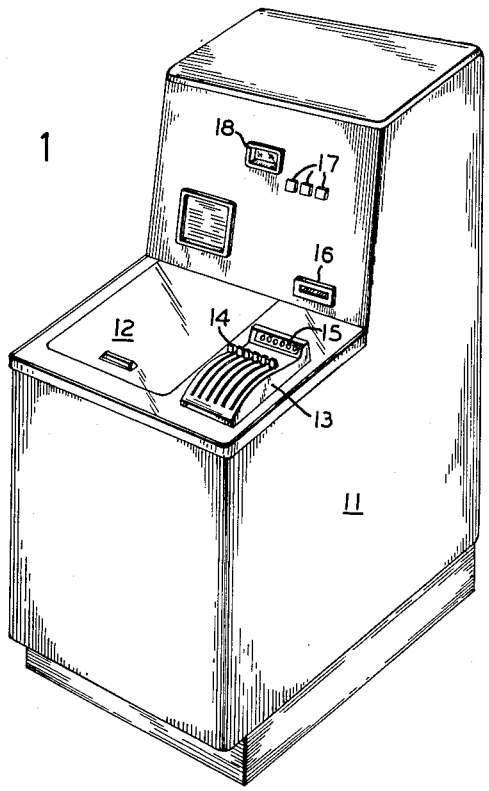
FIGURE 1 is a front perspective view of the machine.

Referring now to the figures and FIGURE 1 in particular, enclosure, numeral 11, encloses the internal mechanism of the machine. A door 12 is mounted for sliding motion and may be moved in horizontal direction toward the rear in order to expose an aperture through which access is gained to receptacles disposed underneath. The receptacles are adapted to receive deposits and are brought in sequence into alignment underneath the door. When the door occupies the forward position, as shown, a deposit is being accomplished by the machine or has been accomplished and thus, the receptacle is no longer accessible to the depositor. A register 13 mounted to the right of the door enables a depositor to set manually a value which corresponds to the total value of the deposit, for instance, the total amount of cash money and checks forming the deposit. This setting is effected by means of movable levers 14 which are settable to digital positions from zero to 9. Rotating wheels faced with numerals and disposed underneath a window 15 are synchronized in movement with the levers to provide a visual check of the setting of the levers. Aperture 16 on the inclined vertical panel permits the issuance of a printed receipt to the depositor which receipt shows pertinent data concerning the deposit. Telltale lights 17 announce the progress of the machine through a deposit cycle. Aperture 18 in the form of a window and inclined mirror 20 (FIGURE 3) mounted to the rear thereof enables image recording means 21 to furnish a pictorial record of the depositor when a deposit is being accomplished.

Figure 2:
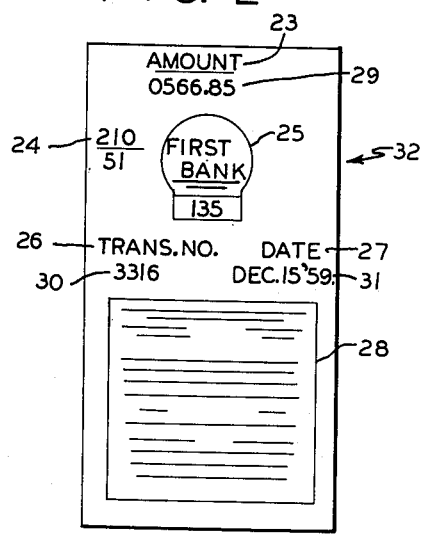
FIGURE 2 is a plan view of a typical receipt which issues to a depositor from the machine.

FIGURE 2 illustrates a typical receipt 32 which issues from the machine to the depositor via aperture 16. The receipt, preferably paper, is provided with preprinted information, particularly the word "Amount" (numeral 23), "Transaction No." 26, the word "Date" 27, the bank code number 24, bank symbol and machine number 25, and suitable advertising material, conditions of deposit acceptance, or instructions 28. At the time of the deposit and just prior to the issuance of the receipt the following additional information is printed on the receipt: Numerical data stating transaction number, numeral 30, the date of the deposit 31, and the total amount of the deposit 29, these latter digits being responsive to the setting of levers 14 on the register shown in FIGURE 1.

Figure 3:
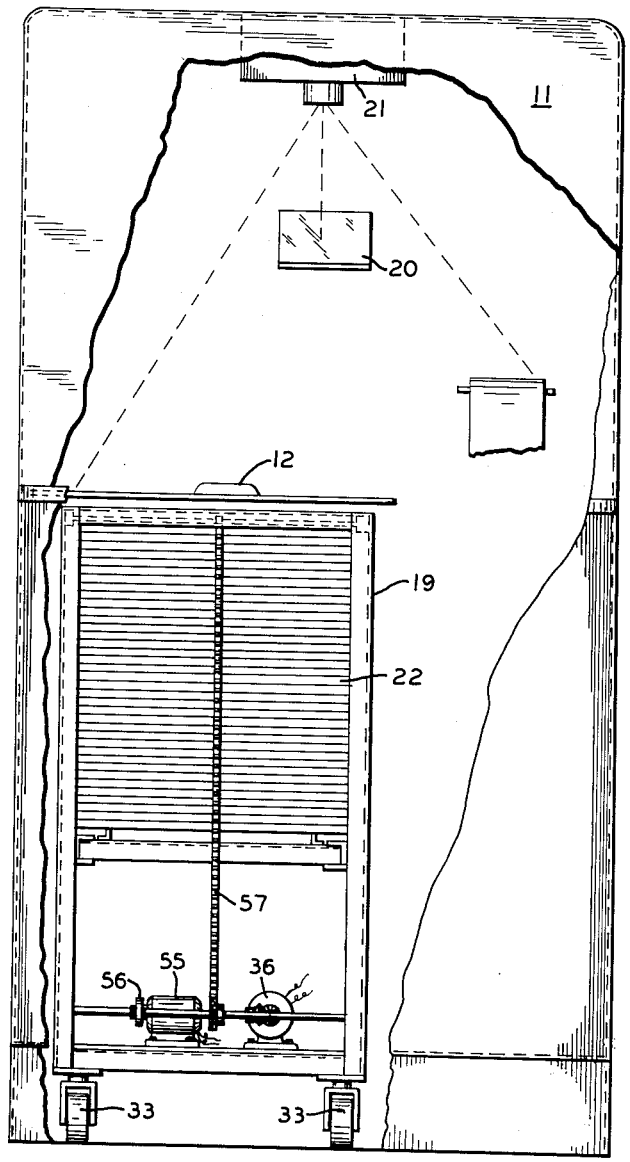
FIGURE 3 is a front elevational view of the machine with the enclosure partially broken away.
Figure 4:
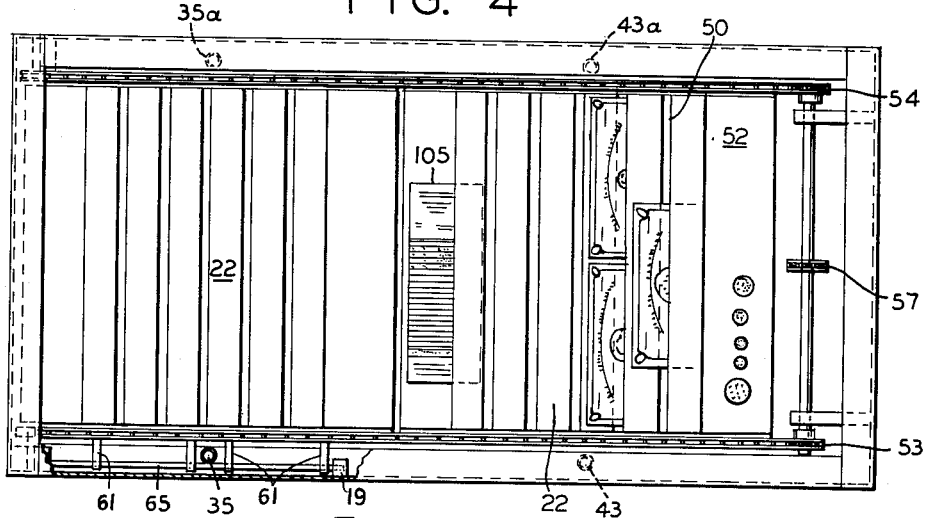
FIGURE 4 is a top view of the storage means and the receptacles therein.

Portions of the internal mechanism of the machine are depicted in FIGURES 3 and 4 which show the storage means 19 mounted on casters 33. The storage means, therefore, is removable from the enclosure, a feature which will be described later. The storage means is formed by a plurality of individual receptacles 22, each receptacle being used for a single deposit so that each deposit is maintained separate from a succeeding deposit and for each deposit disposed in one of the receptacles, there is issued a corresponding receipt 32 as shown in FIGURE 2. FIGURE 3 depicts the recording camera 21 suitably located to view the uppermost receptacle 22, the printed receipt or duplicate thereof, as will be explained later, and via inclined mirror 20 and aperture 18, the depositor.

The storage mechanism, in general, comprises two vertical arrays of traylike receptacles wherein the individual receptacles, when empty, successively move to the top in the front array, become loaded when door 12 is moved to the rear by the depositor, then are moved horizontally toward the rear array and sequentially are lowered in this array. Thus, receptacles in the front array are empty while receptacles in the rear array contain deposits. In order to empty the receptacles, the entire storage mechanism is rolled out of the enclosure and the receptacles are shifted back in the reverse order whereby unloading is accomplished as each individual receptacle becomes disposed at the top position.

Figure 5:
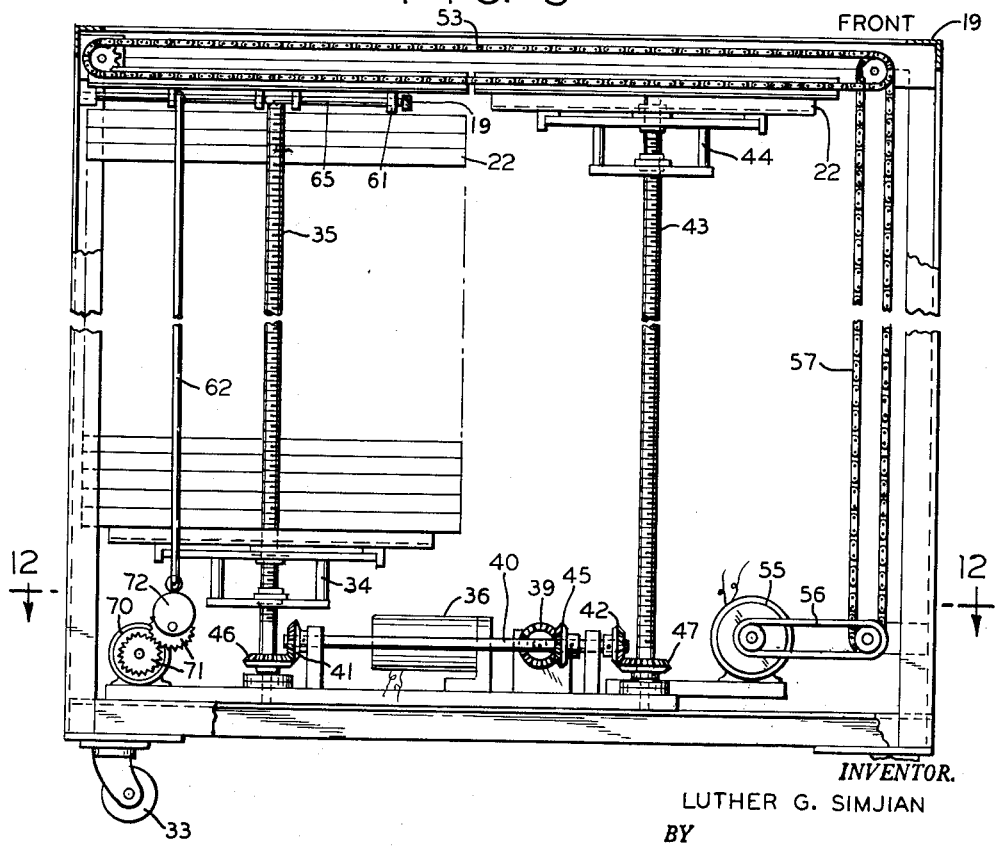
FIGURE 5 is a side elevational view of the storage means.
Figure 12:
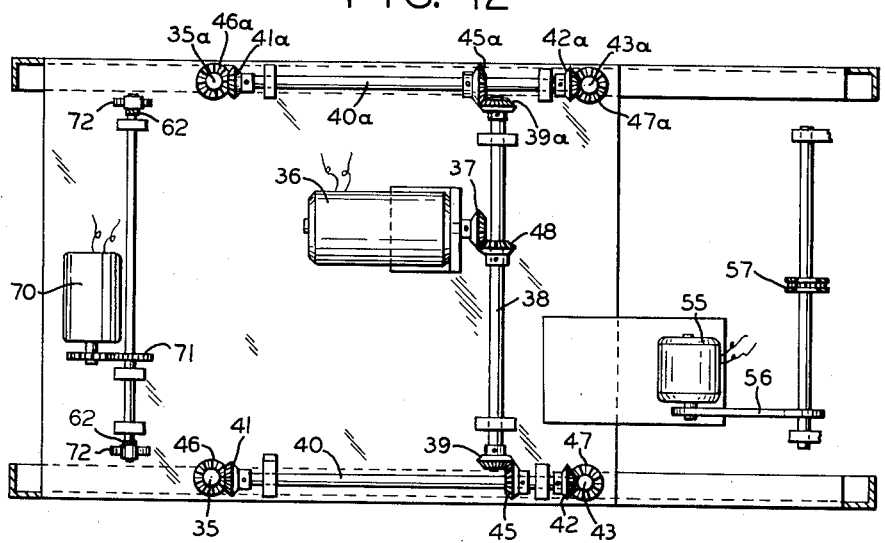
FIGURE 12 is a sectional view taken along lines 12—12 in FIGURE 5, revealing the disposition of the drive means at the base of the storage means.

The mechanism effecting the vertical motion of the receptacles comprises in part, two movable platforms 34 and 44, FIGURE 5, which support the respective arrays of receptacles. Each platform is engaged for vertical motion by a set of vertical lead screws 35 and 35a, and 43 and 43a, respectively. Referring to FIGURE 12, lead screws 35 and 35a are driven in parallel and unison via electric motor 36, gears 37 and 38, gears 39 and 39a, gears 45 and 45a, shafts 40 and 40a, gears 41 and 41a, and gears 46 and 46a. Vertical lead screws 43 and 43a are driven also in unison and in synchronization with the previous pair of lead screws by means of shafts 40 and 40a, gears 42 and 42a, and 47 and 47a, respectively. The direction of rotation of lead screws 35 and 35a is opposite to that of screws 43 and 43a.

Stacked on each platform there is a group of deposit receptacles 22, although as explained heretofore, at the start all of the receptacles would be disposed on platform 44, the supply position, whereas receptacles located on platform 34 have been moved to, what may be considered, the storage position. Each receptacle 22, FIGURE 6, is formed from a flat sheet of appropriate material, for instance metal, having a bottom panel, four upstanding sides, and a number of suitably formed and located dividing strips 50 so as to provide pockets. A clip 51 is attached to each side of the receptacle in order to effect horizontal motion of the receptacle as will be described below. Additionally, a concave strip 52 is provided in lieu of one pocket in order to facilitate the handling of coins, see FIGURES 7 and 8.

Figure 13:
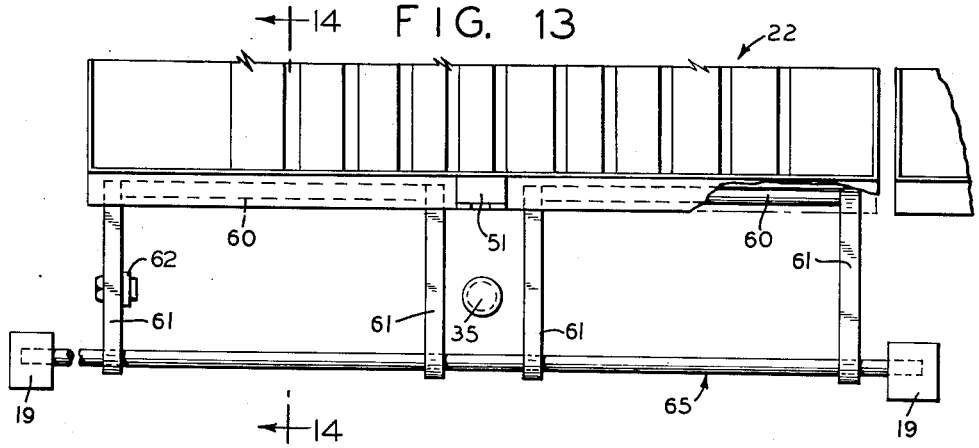
FIGURE 13 is an enlarged detail of the lower left portion in FIGURE 4 showing the mechanism which guides a deposit receptacle from one vertical array to the other array and lowers the receptacle on a preceding one in the storage array.

Along the top of the storage means there is disposed on each side an endless chain 53 and 54, FIGURE 4, both chains being driven in unison by electric motor 55, belt 56, a set of suitable sprockets and idler chain 57. Prongs 58, FIGURE 9, forming a part of clip 51 on each receptacle are shaped to engage with the rollers of chains 53 and 54 and when a deposit has been accomplished, the respective receptacle is moved from the deposit acceptance position (top of front array) to the top of the storage position (rear array). From there, each tray is lowered by a mechanism more clearly shown in FIGURES 13 and 14.

A set of two shafts 65, one shaft each on opposite sides of the storage means 19, is held in the framework. Each shaft supports four links 61, which are fastened to the respective shaft. Links 61 by means of rods 60, are adapted to engage and support the underside of the newly filled receptacle which has been moved horizontally from the front array to the rear array. When a filled receptacle has reached the top of the rear array, it is located topmost on the vetical storage array. At this point, the chain driving motor 55 stops and motor 70 (FIGURES 5 and 12) acting through a set of gears 71 and respective cams 72 lowers associated rods 62 on either side of the tray, thus causing the links 61 to assume the dashed position indicated by numerals 63, FIGURE 14. The receptacle now rests on the preceding receptacle and the links disengage from the receptacle, but continue to move further toward the dashed position 64. At this point, motor 36 causes the supply array to move up a distance equal to the vertical height of one receptacle and correspondingly the storage array moves down an equal amount as both arrays move in synchronism as explained heretofore. Next, motor 36 which causes vertical motion of the arrays is stopped and motor 70 is energized to cause links 61 to pivot upward so that they resume their initial position, ready to receive another receptacle. In the process of raising the array of empty receptacles, the uppermost empty receptacle now engages the horizontal transport chains 53 and 54 via clips 51. The reason for providing links 61 and the associated lowering mechanism is to arrange for clearance between the new and the previously filled receptacle so that during rearward motion of the new receptacle, the deposit in the just preceding one is not disturbed.

When all receptacles from the supply array have been transferred to the storage position, or at any other desired time, the entire storage means is removed from the enclosure and replaced by another and substantially identical storage means, the latter having all of its receptacles disposed in the supply array so as to be ready for deposits when each receptacle reaches the deposit acceptance position. The storage means containing the deposits is then emptied by a teller or other official by reversing the previously described motion, that is, the filled receptacles are raised from the storage position and as each receptacle is rendered accessible at the top of the arrays, the teller removes the deposits from the respective receptacles and effects proper credit to the depositors' accounts. When the last receptacle has been emptied, the storage means is ready for reuse in the enclosure. The reversing of the motions can readily be accomplished by using bi-directional motors or by operation of suitable clutching mechanisms in order to facilitate this reverse motion.

At the time of effecting a deposit, the depositor fills out a conventional deposit slip, numeral 105, FIGURE 4, then deposits this slip together with paper money, documents and coin money in the receptacle. As clearly seen in FIGURE 4 all items are suitably arranged for display. The deposit slip 105 occupies a pocket which is set aside for this purpose. Paper money and documents occupy the next pockets and coin money is disposed in the space provided.

Figure 15:
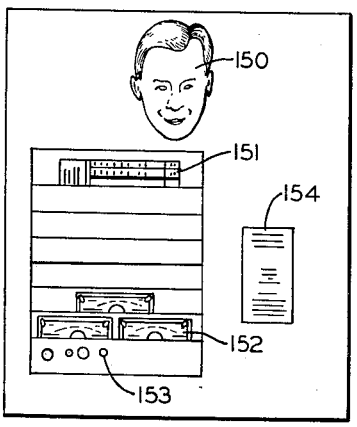
FIGURE 15 is a plan view of a typical pictorial record provided by image recording means disposed for coaction with the instant machine.

When a deposit is to be effected, door 12 is moved toward the rear and the topmost receptacle of the supply array becomes exposed to the depositor to receive the deposit and deposit slip. At the same time, the depositor sets the individual levers 14 of the register 13 to positions which coincide with the totalized sum derived by adding the individual items on the deposit slip and shown thereon. The display apparent at window 15 serves as a visual check with respect to the position of the individual levers. The setting of the individual levers is desired in order to provide the depositor with a receipt, FIGURE 2, which among other notations is imprinted with the totalized amount of the deposit. It is realized that the depositor may innocently or intentionally misplace the levers so that he actual amount of the deposit and that stated on the receipt would be at variance. For this reason, the image recording means described heretofore is provided which produces an image of the actual deposit and of the deposit slip disposed in the receptacle, as well as an image of the issued receipt, or a copy thereof, along with an image of the depositor. In this manner any discrepancy may be resolved readily by reference to the image of the actual deposit, which documentary proof obviously is convincing and legal evidence. FIGURE 15 shows a typical photographic record provided by the camera means. As it is shown, this record depicts an image of the depositor 150, an image of the deposit slip 151, partial images of paper bills 152, images of coin money 153, and an image of the receipt 154 or a copy thereof. It will be apparent to those skilled in the art, that a double lens system on camera 21 will be necessary if the distance from the depositor to the camera is substantially greater than the distance from the camera to the receptacle and receipt. Such a system has been shown, for instance, in application for U.S. Letters Patent, Serial No. 745,020, previously referenced.

The operation of the register 13, the printing of a receipt which issues to the depositor and the furnishing of a record of the receipt remaining in the machine is more clearly illustrated in FIGURE 16. When a lever 14 is moved to an appropriate position, the lever operates a linkage mechanism which comprises an extension 95 pivoting about the axis of shaft 103. Link 96 attached to extension 95 moves proportionately a stamp type printing machine whose numerals can be set to positions from zero to 9 in accordance with the displacement motion. Numeral 88 shows such a printing mechanism which is commercially available, being manufactured for instance by Wm. A. Force and Company, Inc., 216 Nichols Avenue, Brooklyn 8, New York, and being known as "Quick Change Numbering Machine." This stamp type printing mechanism comprises digital printing wheels including a self-inking arrangement, etc. Mounted along with this printing mechanism 88, there is a consecutive numbering printer 87 which provides the transaction number on the receipt, and a commercial date stamping mechanism 86 which supplies the date notation of the deposit transaction, all arranged as shown also in FIGURE 2. These three printing mechanisms are actuated by eccentric cam 89 which acts upon a common plate 90 causing the plate to move in reciprocatory motion to effect the printing of the receipt. A rack 97 connected to extension 95 engages gear 98 and via meshing gear 99 positions the associated counter wheel visible at window 15. It is understood that there is an identical array for each of the levers on the register so that for a 6-digit number there would be six identical arrangements.

When the printing mechanisms have operated, a reset solenoid 93 coupled to a slotted bar 94, which contains a slot 101 for each extension 95, see FIGURE 17, causes the register levers to be reset to the zero position.

The receipt printing and issuing mechanism comprises a roll 80 carrying two rolls of preprinted forms with carbon paper interleaved. The forms are preprinted substantially as described in conjunction with FIGURE 2. Alternately, instead of carbon paper, pressure sensitive paper may be used which shows an image upon the application of pressure. These forms are passed in superposed relation over a guide roller 83 and underneath platen 84, the latter being opposed by the printing mechanisms, and over guide roller 85. At this roller the superposed sheets are separated and the original receipt 32 passes underneath solenoid actuated knife 92 which acts against a cutting edge 102 when being pulsed by solenoid 91 to cause separation of a printed receipt from the roll. The original printed receipt then is issued to the depositor via aperture 16.

The carbon sheet and the copy of the printed receipt are fed around guide roller 85 where they separate, the carbon sheet being reeled at roller 82 while the copy of the printed receipt is fed toward roller 81. It will be noted that the tape containing the copy of the printed receipt now is turned over so that the printing is in view of the camera 21 and when this copy is disposed approximately half way between roller 85 and 81, the camera is triggered to provide the recorded image of the receipt, together with a photograph of the depositor 100, and the deposit and deposit slip in receptacle 22. For the sake of simplicity, the paper feed motor, take up mechanism for the driven rollers and lights for photography have been omitted from the illustration.

Figure 18:
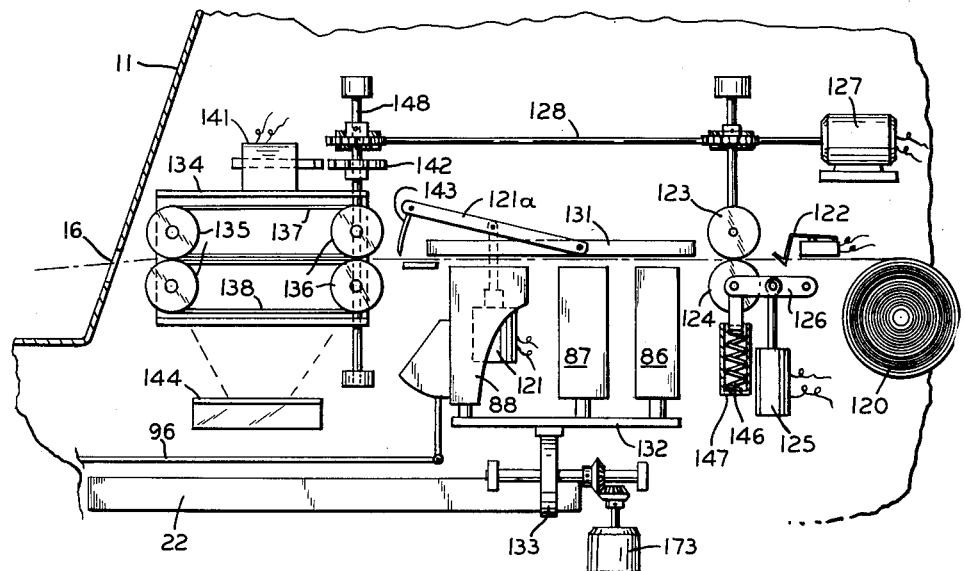
FIGURE 18 is an elevational side view, partly in section, depicting an alternate means of printing and issuing a receipt to the depositor.
Figure 19:
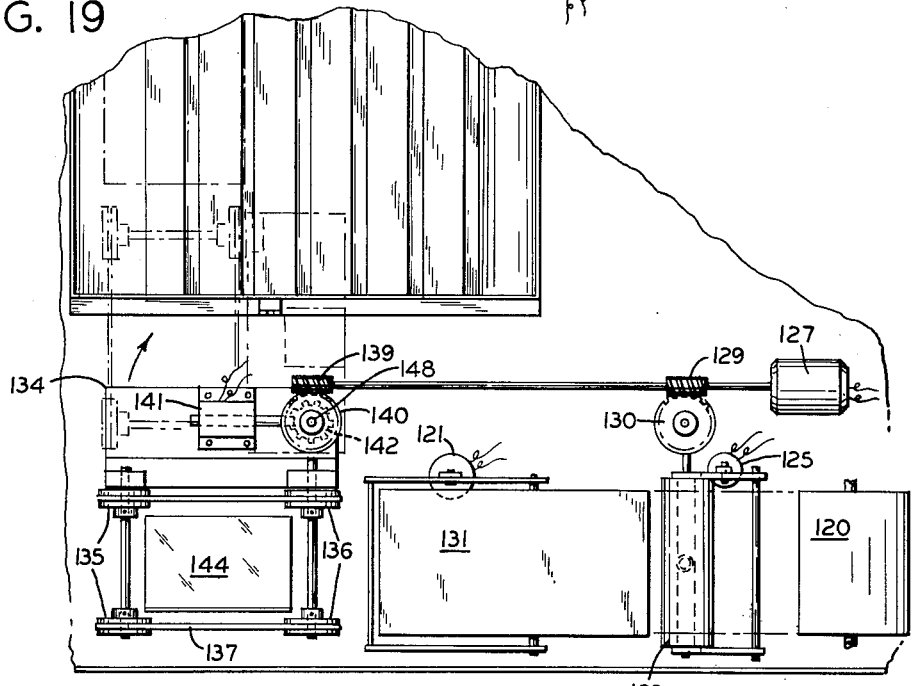
FIGURE 19 is a plan view of the arrangement shown in FIGURE 18.

FIGURES 18 and 19 show an alternate method of distributing, recording and storing the receipt. In this alternate method, the original receipt and copy is produced from a single roll 120 of preprinted recording paper. The roll at certain intervals carries perforations which actuate switch 122, FIGURE 18, to dispense the proper length of the receipt. Printing mechanisms 86, 87 and 88 are identical to the previously described ones and are actuated in unison by eccentric cam 133 and plate 132 exerting pressure against platen 131, the receipt paper being confined between the printing mechanisms and the platen. The paper is driven by roller 123 as long as opposing roller 124 mounted on arm 126 is biased against roller 123 by means of spring 146 which is contained in housing 147. When solenoid 125 is energized, roller 124 is moved away from the opposing feed roller and motion of the paper stops although roller 123 may still be turning. Printing mechanism 88 is set to the appropriate digits by linkages 96 in the manner described heretofore and the printing of the receipt is accomplished as has been described in conjunction with FIGURE 16.

Motor 127 acting through shaft 128, worm 129, gear 130 and a right angle gear box causes roller 123 to turn, thus moving the stamped receipt disposed opposite platen 131 toward the left. Housing 134 contains four shafts, each shaft being equipped with a set of pulleys 135 and 136 fastened thereon. Rubber belts 137 and 138 are mounted on the pulleys as clearly shown in FIGURE 18 so as to form a transport means for the receipt after the latter passes from the stamping or printing area. Pulleys 136 are driven by shaft 128 via worm 139 and gear 140 at the same speed as is feed roller 123. Mounted on shaft 148 there is a toothed wheel 142 and mounted on housing 134 there is a solenoid 141 in such a way that the solenoid plunger can engage toothed wheel 142. When this engagement takes place, the entire housing 134 is locked to shaft 148, thus causing the housing to rotate in unison with the shaft as long as the solenoid plunger remains in engagement with wheel 142. The direction of the motors and of the gearing is such that when roller 123 and pulleys 136 rotate to feed the receipt in a forward direction, the housing 134 upon energizing solenoid 141 will rotate in a clockwise direction about shaft 148.

In operation, the printing means 88 is adjusted from the register levers and upon rotating cam 133 driven by motor 173, this information is stamped onto the receipt, together with the transaction number and date. Motor 127 then is energized, moving the receipt from the printing position opposite the platen into housing 134. When switch 122 senses an aperture in the feed roll, the length of the receipt is measured and subsequently solenoid 125 is actuated for stopping the forward motion of the receipt paper from the roll. Simultaneously, solenoid 121 receives energy, causing cutter 143 mounted on arm 121a to cut the paper thereby allowing the receipted portion to continue forward through housing 134 and through aperture 16 to the depositor because motor 127 continues to drive pulleys 136. When the receipt is still disposed in the housing 134, by means of flash photography a photograph is made of the receipt along with the depositor and the deposit, as has been described heretofore. Since the printed information on the receipt faces downward, i.e. away from the camera, inclined mirror 144 disposed below housing 134 is provided to bring the receipt in view of the camera.

As the printed receipt was fed to housing 134, a new receipt came into position opposite platen 131. Subsequently, cam 133 is operated again to produce a second or duplicate receipt. It will be obvious to those skilled in the art that in this instance the transaction number printing mechanism is set for duplicate, consecutive numbering and that the printing mechanism which prints the totalized sum has not as yet been zeroized. The date stamp is set manually at the start of a business day. When the printing mechanism retracts, solenoids 125 and 121 are deenergized, thereby causing the newly furnished duplicate receipt to move forward into housing 134 until switch 122 senses an ensuing hole. It should be observed that during this period motor 127 remains running. Next, solenoids 125 and 121 are actuated as previously described to cut the receipt and stop feeding of paper but, in addition, solenoid 141 is actuated thereby causing housing 134 which carries the duplicate receipt to rotate 90° clockwise about the center of rotation of shaft 148.

When reaching the 90° rotation, see dashed position on FIGURE 19, solenoid 141 is deenergized thus stopping the rotation of the housing and feeding the duplicate receipt out of housing 134 onto the receptacle 22 disposed underneath which contains the deposit relating to this receipt. In this manner, a first receipt is issued to the depositor via aperture 16 and a second and duplicate receipt is deposited upon the receptacle so that each receptacle when being emptied has the duplicate receipt physically located therein.

To reset housing 134, the direction of rotation of motor 127 is reversed, solenoids 125, 121 and 141 remain energized until the housing resumes its original position for issuing the next receipt through aperture 16. Finally, the printing wheels on printing mechanism 88 are zeroized as has been described previously.

Figure 10:
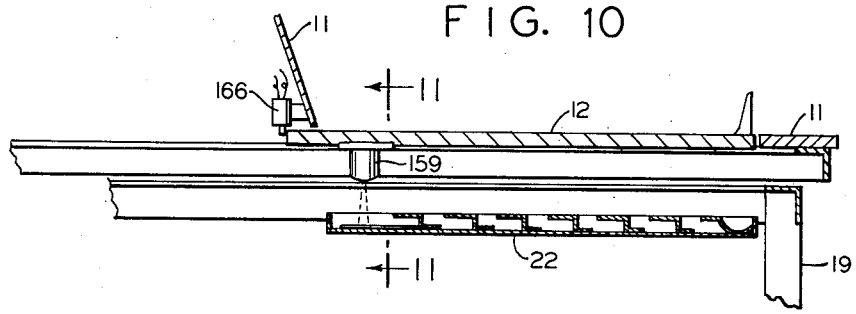
FIGURE 10 is a sectional view through the enclosure at the position of the access door and showing a receptacle disposed beneath the access door.
Figure 11:
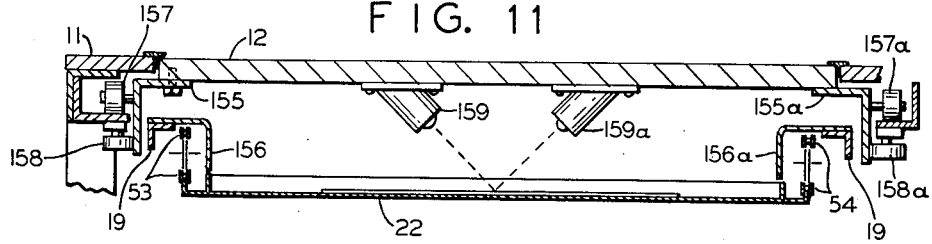
FIGURE 11 is a sectional view along lines 11—11 in FIGURE 10.

One of the important provisions concerns the arrangement for determining that a deposit slip has been placed on the tray together with the deposit in order to assure that a deposit of cash money, for instance, can be credited by the bank to the proper account. FIGURE 10 reveals the feature of ascertaining the presence of the deposit slip which figure in general depicts a partial section through the front of the enclosure at the door level. The receptacle 22 is shown in the position where it has received a deposit and the door 12 has been closed. Photoelectric sensing means 159 and a light source 159a, FIGURE 11, are mounted on the underside of the door and moved therewith. Closing of the door brings the photoelectric sensing means in position to sense the presence or absence of a deposit slip. The amount of light incident upon the photoelectric cell establishes which of the two conditions exists. Solenoid 166 is shown as holding the access door locked in the closed position.

FIGURE 11 is a section along lines 11—11 in FIGURE 10 and further reveals the position of the light source and photoelectric means. Attached to the door sides are angles 155 and 155a bearing rollers 157 and 157a, respectively, which run on angles forming a part of the enclosure 11. These angles in turn have rollers 158 and 158a so mounted as to keep door 12 in a restricted lateral space while allowing the door to move freely from front to rear on rollers 157 and 157a. Sheet metal guards 156 and 156a attached to the receptacle storage frame 19 cover the chains 53 and 54, see FIGURE 5.

*Circuit Diagram*

A typical schematic circuit diagram for the instant machine using the alternate arrangement per FIGURES 18 and 19 is shown in FIGURE 20. At the start of operations door 12 is ajar, there are sufficient receptacles 22 in the supply array and a "ready" light on the front panel of the unit is energized. To initiate operation, door 12 is moved rearward to expose the topmost deposit receptacle. When the door reaches its fully open position, limit switch 167 is actuated, thereby energizing relay 169 which locks up through associated contact 170 and closed switch 194. When the deposits have been made (including a deposit slip), door 12 is moved forward to its closed position, operating limit switches 165 and 164. If there is no deposit slip, the photo cell switch 168 remains in the position shown and relay 160 remains deenergized. "Deposit Slip Missing" light is then illuminated and door lock solenoid 166 remains energized, thus preventing the door from being locked.

If a deposit slip is properly in place on the receptacle, then when the door is closed, photo cell switch 168 will energize relay 160 which locks up through associated contact 161 and cam switch 177. Contact 162 associated with relay 160 deenergizes the door lock solenoid 166, thus locking the door and at the same time provide a path via switch 165 to contacts 171 and 172 of relay 169. Contact 171 of relay 169 energizes timing motor 178 which will run for one revolution by means of cam 179 and associated contact 186. Similarly, contact 172 will energize timing motor 196 which will run for one revolution by means of cam 197 and its associated contact 204.

Motor 196 and its associated cams and switches control the components within the framework of storage means 19 and will be treated first.

With switch 215 in the "deposit" position (toward left in FIGURE 20) and timing motor 196 running, cam 198 operates associated switch 205, causing motor 55 through its previously mentioned sprocket and chains 53 and 54 to move the topmost receptacle 22 containing the deposit horizontally to the rear until the receptacle reaches a position above the storage array at which point the receptacle operates switch 194 causing drop out of relay 169 and also removing voltage from motor 55. Next, cam 199 operates its associated switch 206 which pulses motor 70 and through cam 212 driven thereby and switch 213, cam 72 is rotated by one-half revolution, thus lowering the receptacle 22 disposed on the right array via rods 62 and associated linkages as previously described in conjunction with FIGURES 13 and 14. Next, cam 200 and associated switch 207 start motor 36 which, through associated gearing and lead screws 35, 35a, 43 and 43a previously described, raises the supply array by one receptacle and lowers the storage array by an equal amount. The correct amount of vertical motion of either array is sensed by limit switch 195, the latter being actuated when the upper receptacle on the left array assumes its predetermined topmost position. Switch 195 cuts off motor 36 via switch 207. The second detent on cam 199 again operates switch 206 and as before, causes cam 72 to execute another half revolution to return rods 62 to the starting position.

Referring back to timing motor 178 and its associated cams and switches, cam 180 and its associated switch 187 start motor 173 which by means of cam 174 and switch 175 cause cam 133 to make one-half revolution, thus causing the first recepit to be imprinted, FIGURE 18. Next, cam 181 through switch 188 causes motor 127 to run in a direction to eject the receipt. As the paper advances, switch 122 is lifted out of the hole in the paper thereby opening the circuit to solenoids 121 and 125. Cam 182 via switch 189 applies a voltage to switch 122 so that when the latter senses the next hole or recepit length, solenoids 121 and 125 are actuated for cutting the receipt and stopping forward motion of the paper which forms the second or duplicate receipt. The receipted portion is not affected and since motor 127 is still running, the receipt is delivered via aperture 16 to the depositor. Just prior to this delivery and while the receipt is still in housing 134, cam 185 via switch 192 operates the recording camera and associated lights. When employing flash techniques, the advance of the receipt need not be stopped.

The second detent on cam 180 now operates switch 187 again and as before, motor 173 through cam 133 effects stamping of the receipt. Immediately thereafter cam 182 causes switch 189 acting through switch 122 to deenergize solenoids 121 and 125, raising the knife blade 143 and retracting the roller 124 so that the receipted portion now moves forward. As cam 182 continues, it again operates switch 189 and, as previously shown, when switch 122 senses the ensuing hole, the same operations are repeated, i.e., severing the receipt and stopping the forward motion of the paper feed disposed to the rear of the knife. Next in sequence, cam 183 through switch 190 operates solenoid 141 to engage the sprocket 142 to cause rotation of housing 134 by 90 degrees.

During the rotating period there is no forward motion of the second receipt through the mechanism since the shaft 148 is not turning relative to the housing 134. As the housing reaches 90 degrees of rotation, cam 183 causes drop out of solenoid 141 and forward motion of the receipt starts again. The receipt now is delivered onto the top of the deposit receptacle. Subsequently, cam 183 and switch 190 again energize solenoid 141 which locks the housing 134 to shaft 148 as before and simultaneously cam 181 stops the forward motion of motor 127 while cam 184 via switch 191 starts the motor in the reverse direction (note that roller 124 is still disengaged so that rear portion of paper is not affected) thus returning the housing to its original position. At this point solenoids 121 and 125 and 141 are all deenergized, motor 127 is stopped and cam 179 stops the timing motor 178 via switch 186.

When motor 173 effected printing of the second receipt and its associated cams were making the second half of their respective revolution, cam 176 via switch 177 energized solenoid 93 thereby causing the register levers to be returned to the zero position. At the same time, the action of this switch deenergized relay coil 160, thus causing a voltage to be applied to solenoid 166 which in turn releases door 12 and allows it to move to the partially opened position by means of suitable spring means.

When a predetermined amount of trays has been transferred to the deposit storage array, the downward motion of the array will operate switch 193 to illuminate a "non use" light on the front panel. The machine should now be emptied. As has been indicated previously, the storage array is removable from the outer enclosure and it will be understood that all electrical connections leading to the removable portions can be severed by means of standard electrical connectors, which for the sake of simplicity are now shown in FIGURE 20. When the storage mechanism has been rolled out of the enclosure, it will be connected to a suitable source of power in order to render the associated electrical components operable. Switch 215 then is moved to the "Unload" position, the position illustrated in FIGURE 20, and manually operable switch 214 is depressed momentarily to start timing motor 196. It may be helpful to note that when switch 215 is in the "Deposit" position, only the first three switches are closed to establish a circuit from cam switches 205, 206 and 207 respectively, while the remaining three switches are open. Conversely, when switch 215 is in the "Unload" position, the first three switches are in the "open" position and the second set of three switches are closed to permit application of power to circuits including switches 208, 209 and 210 respectively.

Figure 14:
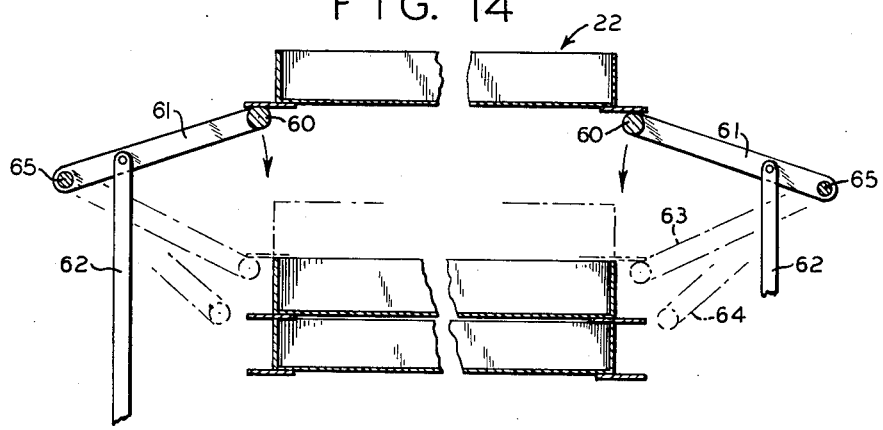
FIGURE 14 is a sectional view taken along lines 14—14 in FIGURE 13.

Motor 196 again is timed by cam 197 and switch 204 to cause one complete revolution of the associated cams. Rotation of cams 199, 200 and 201 has no effect on the circuit. However, the first detent on cam 201 causes operation of switch 208 which in turn causes rotation of cam 72, driven by motor 70, rotation of cam 212 and actuation of contact 213 associated therewith. Operation of this motor lowers the mechanism comprising bars 62 and links 61 (FIGURE 14). Now, motor 36 under control of cam 202, switches 209 and 195 becomes energized and reverses its previous motion, this time raising the storage array and lowering the supply array. When the arrays are moved by a thickness equal to the height of one receptacle, switch 195 cuts off motor 36 at which point the second detent on cam 201 causes another one-half revolution of cam 72 to effect the raising of links 61 to carry the topmost receptacle to its uppermost position, i.e., to engagement with chain 53. Cam 203 then operates switch 210 to effect rotation of motor 55 in such a direction as to shift the tray from the rear array toward the front array. When switch 195 is actuated by the horizontally moving receptacle, power is removed from switch 210 and motor 55. At this point the receptacle is manually unloaded and by depressing switch 214, the foregoing operation is repeated until all receptacles have been brought upward, shifted horizontally, unloaded, and returned to the proper alignment of the supply array. The storage means now is available for reuse in the enclosure.

It will be obvious that many changes and alternate arrangements may be provided. One of such alternate embodiments concerns the image recording of the indicia which are responsive to the setting of levers 14. Instead of photographing the receipt itself in order to provide a record of these indicia, thus requiring a printing operation to occur first, the display underneath window 15 readily can be repeated inside the enclosure by mechanical or electrical means. Alternately, by mirror means the position of the levers themselves can be brought into view of the camera means.

The camera means 21 used, as will be understood by those skilled in the art, is an electrically operated one with automatic film wind up. Cameras of this type are well known and do not need to be described. In an alternate arrangement electronic scanning means, electromagnetic recording means, etc., may be used without deviating from the intent and purpose of such a recording arrangement.

It will be apparent that the machine described hereinbefore is ideally suited for operation in banking institutions where a plurality of machines are installed side by side and operated under the general supervision of a teller. In this manner, waiting time for individual depositors is reduced and the unloading of the machines can be accomplished during the slack business periods. Still other advantages will be apparent to persons experienced in the art of banking and commerce.

While there has been described and illustrated a specific embodiment of the present invention together with certain variations thereof, it will be apparent to those skilled in the art that various other modifications and further changes may be made therein without departing from the intent and principle of the present invention which should be limited only by the scope of the appended claims.

What is claimed is:

1. In a depository machine for use by a depositor, the combination of: storage means disposed in the machine comprising a plurality of receptacles, each receptacle adapted to move sequentially from a supply position to a deposit acceptance position and to a storage position; motive means for moving said receptacles to said positions; aperture means disposed on said machine for providing the depositor with access to the receptables and enabling deposit of an article and of a deposit slip when a receptacle is disposed at the deposit acceptance position; image recording means disposed to view the article and deposit slip deposited in the receptacle; control means operable by the depositor for rendering the article and deposit slip received by the receptacle inaccessible to the depositor and for causing said image recording means to produce a recorded image showing the article and deposit slip disposed in the receptacle in associated relation with one another; means coacting with said receptacle when disposed at said acceptance position to sense the presence of the deposit slip and prevent operation of the machine in the absence of a deposit slip on said receptacle, and means responsive to the operation of said control means actuating said motive means to move the receptacle containing the article and deposit slip to said storage position while advancing another receptacle from said supply position to the deposit acceptance position.

2. In a depository machine of the type described which machine includes image recording means, the combination of: storage means disposed in the machine; said storage means comprising a plurality of tray-like receptacles; each receptacle adapted to move sequentially from a supply position to a deposite acceptance position and to a storage position; motive means for moving said receptacles to said positions; aperture means disposed on the machine for exposing a respective receptacle and providing access to the respective receptacle when the latter is disposed at the deposit acceptance position whereby a deposit placed in the receptacle through the aperture means is adapted to be viewed from the exterior of the machine; means for rendering the deposit after placement in the receptacle inaccessible to the depositor; image recording means disposed to view the receptacle and deposit disposed therein; control means actuating the recording means in response to the operation of said means rendering said deposit inaccessible whereby to produce a recorded image of the deposit in the condition placed in the receptacle and previously viewed from the exterior of the machine, and said control means actuating also said motive means for causing the respective receptacle with its deposit to be disposed in the storage position subsequent to actuation of the image recording means.

3. In a depository machine of the type described which machine includes image recording means, the combination of: storage means disposed in the machine; said storage means comprising a plurality of tray-like receptacles; each receptacle adapted to move sequentially from a supply position to a deposit acceptance position and to a storage position; motive means for moving said receptacles to said positions; aperture means disposed on the machine for exposing a respective receptacle and providing access to the respective receptacle when the latter is disposed at the deposit acceptance position whereby a deposit placed in the receptacle is adapted to be viewed from the exterior of the machine through the aperture means; means for rendering the deposit after placement in the receptacle inaccessible to the depositor; image recording means disposed to view the receptacle and deposit disposed therein; control means actuating the recording means in response to the operation of the means rendering the deposit inaccessible whereby to produce a recorded image of the receptacle and of the deposit therein, and said control means actuating also said motive means for causing the respective receptacle with its deposit to be disposed in the storage position subsequent to actuation of the image recording means.

4. In a depository machine of the type described which machine includes image recording means, the combination of: storage means disposed in the machine; said storage means comprising a plurality of tray-like receptacles; dividing means provided in each receptacle for retaining a flexible article placed in the receptacle substantially flat; each receptacle adapted to move sequentially from a supply position to a deposit acceptance position and to a storage position; motive means for moving said receptacles to said positions; aperture means disposed on the machine for exposing a respective receptacle and providing access to the respective receptacle when the latter is disposed at the deposit acceptance position whereby a deposit placed in the receptacle through the aperture means is adapted to be viewed from the exterior of the machine; means for rendering the deposit after placement in the receptacle inaccessible to the depositor; image recording means disposed to view the receptacle and deposit disposed therein; control means actuating the recording means in response to the operation of the means rendering the deposit inaccessible whereby to produce a recorded image of the deposit, and said control means actuating also said motive means for causing the respective receptacle with its deposit to be disposed in the storage position subsequent to the recording of an image of said deposit.

5. In a depository machine of the type described which machine includes image recording means, the combination of: storage means disposed in the machine; said storage means comprising a plurality of tray-like receptacles; dividing means provided in each receptacle for retaining a flexible article placed in the receptacle substantially flat; each receptacle adapted to move sequentially from a supply position to a deposit acceptance position and to a storage position; motive means for moving said receptacles to said positions; aperture means disposed on the machine for exposing a particular receptacle and providing access to the particular receptacle when the latter is disposed at the deposit acceptance position whereby a deposit placed in the receptacle through the aperture means is adapted to be viewed from the exterior of the machine via said aperture means; means adapted to close said aperture means for rendering the deposit placed in the receptacle inaccessible to the depositor; image recording means disposed to view the receptacle and deposit disposed therein; control means actuating the recording means in response to the closing of said aperture means to produce a recorded image of the deposit whereby the deposit is no longer accessible via said aperture means, and said control means actuating also said motive means for causing the particular receptacle with its deposit to be disposed in the storage position subsequent to the recording of an image of said deposit.

6. In a depository machine of the type described which machine includes image recording means, the combination of: storage means disposed in the machine; said storage means comprising a plurality of tray-like receptacles; dividing means provided in each receptacle for retaining a flexible article placed in the receptacle substantially flat; each receptacle adapted to move sequentially from a supply position to a deposit acceptance position and to a storage position; motive means for moving said receptacles to said positions; aperture means disposed on the machine for exposing a particular receptacle and providing access to the particular receptacle when the latter is disposed at the deposit acceptance position whereby a deposit in the form of money bills, coins and deposit tag placed on the receptacle through the aperture means is adapted to be viewed from the exterior of the machine via said aperture means; a cover including locking means adapted to close said aperture means for rendering the deposit placed on the receptacle inaccessible to the depositor; image recording means disposed to view the receptacle and deposit disposed thereon; control means actuated in response to the cover closing said aperture means for causing said locking means to momentarily maintain said aperture means closed, said control means actuating the recording means to produce a recorded image of the deposit and actuating also said motive means for causing the particular receptacle with its deposit to be disposed in the storage position subsequent to the recording of an image of said deposit whereby the epodsit is not accessible for surreptitious removal through said aperture means.

7. In a depository machine of the type described which machine includes image recording means and ticket dispensing means, the combination of: storage means disposed in the machine; said storage means comprising a plurality of tray-like receptacles; each receptacle adapted to move sequentially from a supply position to a deposit acceptance position and to a storage position; motive means for moving said receptacles to said positions, aperture means disposed on the machine for exposing a respective receptacle and providing access to the respective receptacle when the latter is disposed at the deposit acceptance position whereby a deposit placed in the receptacle through the aperture means is adapted to be viewed from the exterior of the machine; means for rendering the deposit after placement in the receptacle inaccessible to the depositor; image recording means disposed to view the receptacle and deposit disposed therein; control means actuating the recording means in response to the deposit being rendered inaccessible whereby to produce a recorded image of the deposit in the condition placed in the receptacle; said control means actuating also said motive means for causing the respective receptacle with its deposit subsequent to actuation of the image recording means to be disposed in the storage position; means causing operation of the ticket dispensing means in response to the deposit having been rendered inaccessible to the depositor whereby the ticket dispensing means dispense a first indicia carrying ticket and place it onto the receptacle containing the deposit, and said dispensing means dispensing also a second ticket which is rendered accessible from the exterior of the machine to serve as a receipt for the deposit, said second ticket being provided with indicia relating it to the first ticket.

8. In a depository machine of the type described which machine includes image recording means and ticket dispensing means whereby said ticket dispensing means has control means disposed for manipulation from the exterior of the machine, the combination of: storage means disposed in the machine; said storage means comprising a plurality of tray-like receptacles; each receptacle adapted to move sequentially from a supply position to a deposit acceptance position and to a storage position; motive means for moving said receptacles to said positions; aperture means disposed on the machine for exposing a respective receptacle and providing access to the respective receptacle when the latter is disposed at the deposit acceptance position whereby a deposit placed in the receptacle through the aperture means is adapted to be viewed from the exterior of the machine; means for rendering the deposit after placement in the receptacle inaccessible to the depositor; image recording means disposed to view the receptacle and deposit disposed therein; control means actuating the recording means in response to the deposit being rendered inaccessible whereby to produce a recorded image of the deposit in the receptacle while the deposit is inaccessible; said control means actuating also said motive means for causing the respective receptacle with its deposit subsequent to actuation of the image recording means to be disposed in the storage position; means causing operation of the ticket dispensing means in response to the deposit having been rendered inaccessible to the depositor whereby the ticket dispensing means dispense a first ticket and place it onto the receptacle containing the deposit; said dispensing means dispensing also a second ticket which is rendered accessible from the exterior of the machine to serve as a receipt for the deposit, and at least one of said tickets carrying indicia which are responsive to the manipulation of said control means disposed exterior of the machine.

9. In a depository machine of the type described which machine includes image recording means and ticket dispensing means, the combination of: storage means disposed in the machine; said storage means comprising a plurality of tray-like receptacles; each receptacle adapted to move sequentially from a supply position to a deposit acceptance position and to a storage position; motive means for moving said receptacles to said positions; aperture means disposed on the machine for exposing a respective receptacle and providing access to the respective receptacle when the latter is disposed at the deposit acceptance position whereby a deposit placed in the receptacle through the aperture means is adapted to be viewed from the exterior of the machine; means for rendering the deposit after placement in the receptacle inaccessible to the depositor; image recording means disposed to view the receptacle and deposit disposed therein; control means actuating the recording means when the deposit is rendered inaccessible to produce a recorded image of the deposit in the receptacle; said control means actuating also said motive means for causing the respective receptacle with its deposit subsequent to actuation of the image recording means to be disposed in the storage position; means causing operation of the ticket dispensing means in response to the deposit having been rendered inaccessible to the depositor whereby the ticket dispensing means dispense a first and a second indicia carrying ticket and place one of the tickets onto the receptacle containing the deposit while rendering the other ticket accessible from the exterior of the machine to serve as a receipt for the deposit, and one of the tickets dispensed coming in view of the image recording means to cause said recording means when actuated to provide an image of said deposit and of said ticket in associated identifiable relation with one another.

10. In a depository machine of the type described, which machine includes image recording means and ticket dispensing means, the combination of: an enclosure; storage means removably disposed in said enclosure; said storage means comprising a plurality of tray-like receptacles, each receptacle adapted to move sequentially from a supply position to a deposit acceptance position and to a storage position; motive means for moving said receptacles to said positions; aperture means disposed on said enclosure for exposing a respective receptacle and providing access to the respective receptacle when the latter is disposed at the deposit acceptance position in alignment with said aperture means whereby a deposit placed in the receptacle through the aperture means is adapted to be viewed from the exterior of the enclosure via said aperture means; means for closing said aperture means after placement of the deposit in the receptacle thereby rendering the deposit inaccessible for surreptitious removal from the exterior of the enclosure; image recording means disposed to view the receptacle and deposit disposed therein; control means actuating the recording means when the deposit is rendered inaccessible to produce a recorded image of the deposit and the portions of the receptacle not covered by the deposit; said control means actuating also said motive means for causing the respective receptacle with its deposit subsequent to the actuation of the image recording means to be disposed in the storage position while a new receptacle is advanced from the supply position to the deposit acceptance position; means causing operation of the ticket dispensing means in response to the deposit having been rendered inaccessible to the depositor; said ticket dispensing means provided with means to dispense a first and a second indicia carrying ticket and placing one of the tickets onto the receptacle containing the deposit while rendering the other ticket accessible from the exterior of the enclosure to serve as a receipt for the deposit; means causing one of the tickets dispensed to come in view of the image recording means to cause said recording means when actuated to provide an image of said deposit and of said ticket in associated identifiable relation with one another, and said motive means adapted to reverse the motion of said receptacles for unloading of deposit containing receptacles by moving the receptacles from their storage position through the deposit acceptance position to the supply position.

11. In a depository machine as set forth in claim 10 wherein the image recording means and ticket dispensing means are disabled while the motive means move the receptacles from their storage position to the supply position.

12. In a depository machine as set forth in claim 10 wherein the image recording means are disposed to view also the depositor placing the deposit in the receptacle, thus causing an image of the depositor to be recorded when the recording means are actuated.

References Cited in the file of this patent

UNITED STATES PATENTS

| | | |
|---|---|---|
| 616,708 | Hess | Dec. 27, 1898 |
| 2,278,357 | Madden | Mar. 31, 1942 |
| 2,394,225 | Ashford | Feb. 5, 1946 |
| 2,709,636 | Owens | May 31, 1955 |
| 2,923,587 | Zipf | Feb. 2, 1960 |
| 2,926,656 | Hale | Mar. 1, 1960 |
| 2,963,333 | Mestre | Dec. 6, 1960 |

FOREIGN PATENTS

| | | |
|---|---|---|
| 605,678 | Germany | Nov. 16, 1934 |